United States Patent [19]

Fujioka

[11] Patent Number: 4,739,850
[45] Date of Patent: Apr. 26, 1988

[54] WALKING OPERATOR TYPE AGRICULTURAL MACHINE HAVING TRANSMISSION SYSTEM WITH DISK TYPE FRICTIONAL STEPLESS CHANGE SPEED APPARATUS

[75] Inventor: Hisatake Fujioka, Kawachinagano, Japan

[73] Assignee: Kubota, Ltd., Osaka, Japan

[21] Appl. No.: 839,295

[22] Filed: Mar. 13, 1986

[30] Foreign Application Priority Data

Apr. 10, 1985 [JP] Japan ................. 60-76059
Apr. 19, 1985 [JP] Japan ................. 60-85140
Apr. 26, 1985 [JP] Japan ............. 60-64145[U]

[51] Int. Cl.⁴ ..................... B62D 51/04; F16H 15/08
[52] U.S. Cl. ........................... 180/19.3; 56/DIG. 4;
74/197; 172/42; 172/125; 474/25; 474/133
[58] Field of Search ................ 180/19.1, 19.2, 19.3;
172/125, 42, 43; 74/197, 190, 194; 474/25, 26,
73, 5, 133; 192/3.54; 56/DIG. 4, 11.3, 11.4

[56] References Cited

U.S. PATENT DOCUMENTS

| | | | |
|---|---|---|---|
| 2,813,433 | 11/1957 | Adams, Jr. et al. | 474/25 X |
| 2,942,487 | 6/1960 | Claus | 74/197 |
| 3,235,061 | 2/1966 | Craig | 474/25 X |
| 3,529,482 | 9/1970 | Jackson et al. | 74/197 |
| 3,678,707 | 7/1972 | Enters et al. | 74/197 |
| 4,322,934 | 4/1982 | Doi | 474/25 X |
| 4,457,086 | 7/1984 | Bacon | 74/197 X |
| 4,519,459 | 5/1985 | Reaume | 172/42 |
| 4,580,669 | 4/1986 | Marto | 74/197 X |

Primary Examiner—Richard A. Bertsch
Assistant Examiner—Mitchell J. Hill
Attorney, Agent, or Firm—Jordan and Hamburg

[57] ABSTRACT

An agricultural machine has two power transmission lines, one of which includes a disk type frictional stepless change speed apparatus and the other of which includes a belt transmission apparatus. The disk type frictional stepless change speed apparatus comprises a drive disk formed integrally with a split pulley of the belt transmission apparatus, a driven disk in pressure contact with and receiving power from the drive disk, a driven shaft slidably carrying the driven disk, and stays for supporting the driven shaft, the stays being oscillatable about an axis parallel to the driven shaft to permit the driven disk to be released from pressure contact with the drive disk. The agricultural machine further includes a mechanism for sliding the driven disk to effect speed changing. This mechanism is operable to oscillate the stays in a direction to move the driven disk away from the drive disk by an initial operation of the change speed lever and to slide the driven disk into contact with the drive disk by a subsequent operation of the change speed lever, thereby to effect speed changing.

17 Claims, 3 Drawing Sheets

WALKING OPERATOR TYPE AGRICULTURAL MACHINE HAVING TRANSMISSION SYSTEM WITH DISK TYPE FRICTIONAL STEPLESS CHANGE SPEED APPARATUS

BACKGROUND OF THE INVENTION

The present invention relates to a disk type frictional stepless change speed apparatus comprising a drive disk and a driven disk in pressure contact with the drive disk and shiftable along a driven shaft whereby an output of the drive disk is transmitted in varied speeds to the driven shaft, and to an agricultural machine of the type handled by a walking operator and employing the disk type frictional stepless change speed apparatus in its transmission system.

In a the disk type stepless change speed apparatus, the driven disk is pressed very hard against the drive disk to ensure reliable power transmission, and a great force is required to shift the driven disk in this state. A known example of means to reduce this change speed operating force consists in a power actuator such as a hydraulic cylinder as disclosed in the Japanese patent application laid open under No. 56-124927.

Where an actuator is used, however, change speed positions of the driven disk are determined by the actuator operable in response to shift positions of a change speed lever, and it is necessary to provide a feedback mechanism in an actuator control system in order that the relationship between the shift positions of the lever and the change speed positions of the driven disk be an accurate and reproducible one. This renders the apparatus complicated in construction and costly. Furthermore, the use of an actuator permits the driven disk to be slidable with ease while pressed hard against the drive disk, but contributes nothing toward improvement relating to wear of frictional transmission surfaces of the disks occurring in the course of the sliding movements.

The application of the disk type stepless change speed apparatus to a walking operator type agricultural machine has a disadvantage. This type of agricultural machine generally has a transmission system adapted to divide drive from an engine output shaft into two transmission lines, one for propelling the machine and the other for operating an attached working implement. For this purpose the transmission system comprises a first transmission shaft operatively connected to the engine output shaft through a main clutch, and a belt transmission means to branch out power from the first transmission shaft and pass it to a second transmission shaft. The first transmission shaft transmits the drive through the disk type frictional stepless change speed apparatus to axles borne by a transmission case. The entire transmission system inevitably is large since the main clutch is disposed at a separate position from the belt transmission means. Therefore, it has been a pending problem how to make the transmission system and its peripheral elements compact.

SUMMARY OF THE INVENTION

An object of this invention is to provide a disk type frictional stepless change speed apparatus which does not require a great force for a change speed operation and causes minimal wear on friction surfaces of the disks during their relative sliding movement, and also to eliminate the difficulty encountered heretofore in applying the disk type frictional stepless change speed apparatus to the transmission system of an agricultural machine.

The foregoing object is accomplished by providing a disk type frictional stepless change speed apparatus comprising a drive disk, a driven disk in pressure contact with and receiving power from the drive disk, a driven shaft slidably carrying the driven disk, stays for supporting the driven shaft, the stays being oscillatable about an axis parallel to the driven shaft to permit the driven disk to be released from pressure contact with the drive disk, urging means attached to the stays for pressing the driven disk against the drive disk, a change speed lever, and a driven disk shift mechanism for oscillating the stays in a direction to move the driven disk away from the drive disk by an initial operation of the change speed lever and for sliding the driven disk by a subsequent operation of the change speed lever, thereby to effect speed changing.

Furthermore, the improvement in the transmission system of an agricultural machine having the disk type frictional stepless change speed apparatus is accomplished by providing a power transmission apparatus for dividing an output of a drive shaft and transmitting divided outputs to a first transmission line and a second transmission line. This power transmission apparatus comprises a drive pulley attached to the drive shaft and including a first split pulley rotatable in unison with the drive shaft and a second split pulley rotatable relative to the drive shaft, a disk type frictional stepless change speed mechanism for transmitting a torque having undergone a change speed operation to the second transmission line, the disk·type frictional stepless change speed mechanism including a drive disk formed integral with said second split pulley, a transmission shaft constituting part of the first transmission line shaft constituting part of the first transmission line and carrying a driven pulley at a position opposed to the drive pulley, a belt for transmitting power from the drive pulley to the driven pulley, and a tension clutch including a tension pulley to act on the belt, the tension clutch being operable to reduce tension of the belt below a predetermined value thereby to break both the power transmission by the belt and the power transmission by the disk type frictional stepless change speed mechanism.

Other objects and advantages of the invention will be apparent from the following description, the appended claims and the accompanying drawings.

DETAILED DESCRIPTION OF THE PREFERRED EMBODIMENT

Figure 1:
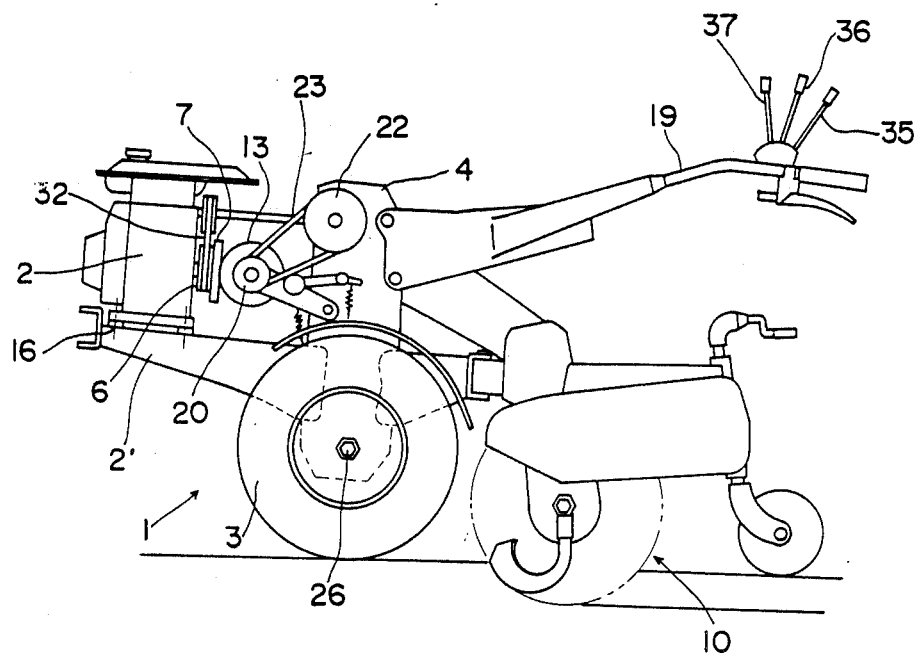
FIG. 1 is a side elevation view of a walking operator type agricultural machine equipped with a transmission system including a typical disk type frictional stepless change speed apparatus according to the present invention.

As described hereinbefore, the present invention provides an improvement in a disk type stepless change speed apparatus and an agricultural machine equipped with a transmission system advantageously including this disk type stepless change speed apparatus. The invention will particularly be described hereinafter taking a walking operator type agricultural machine as shown in FIG. 1 for example, which is one embodiment of the invention and is equipped with a transmission system including the disk type stepless change speed apparatus.

This agricultural machine comprises a machine frame 1 carrying an engine 2 attached by means of slots and bolts 16 to a front engine mount 2' to be movable in the fore and aft direction, a transmission case 4 mounted at an intermediate position of the machine frame 1 and bearing ground-engaging wheels 3, and a rotary plow 10 attached to a rear position of the machine frame 1.

Figure 3:
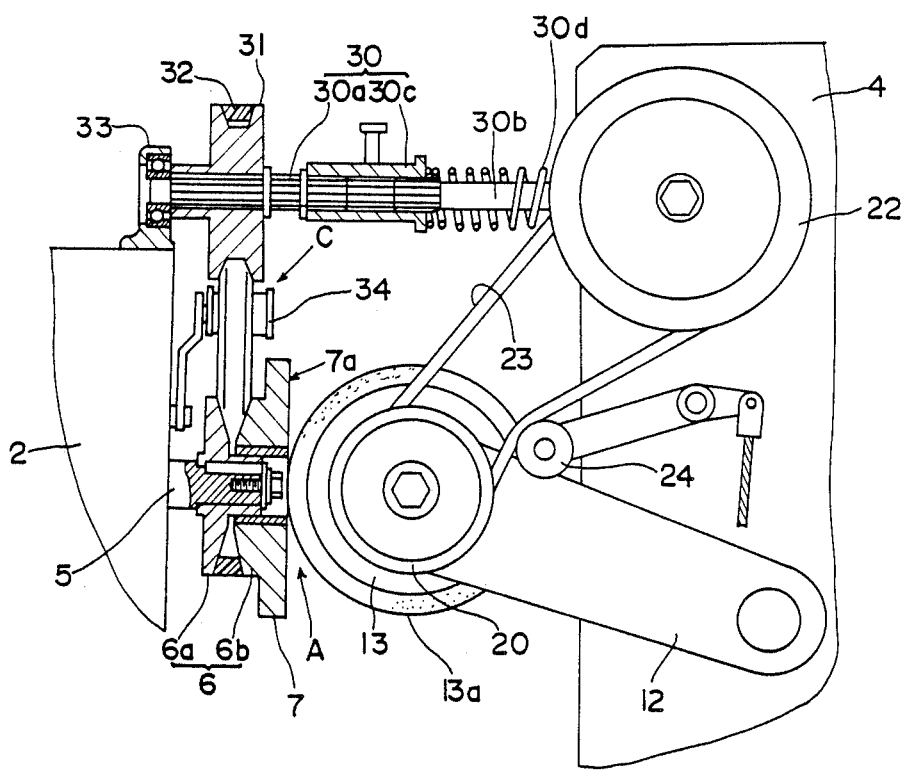
FIG. 3 is a side view, partly in section, of the transmission system.

Referring to FIG. 3, the engine 2 has an output shaft 5 carrying a drive pulley 6. This drive pulley 6 comprises a split pulley part 6a fixed to the output shaft 5 and a split pulley part 6b freely rotatably mounted on a boss portion of the split pulley part 6a. The freely rotatable split pulley part 6b is integral with a drive disk 7 of the disk type stepless change speed apparatus A.

Figure 2:
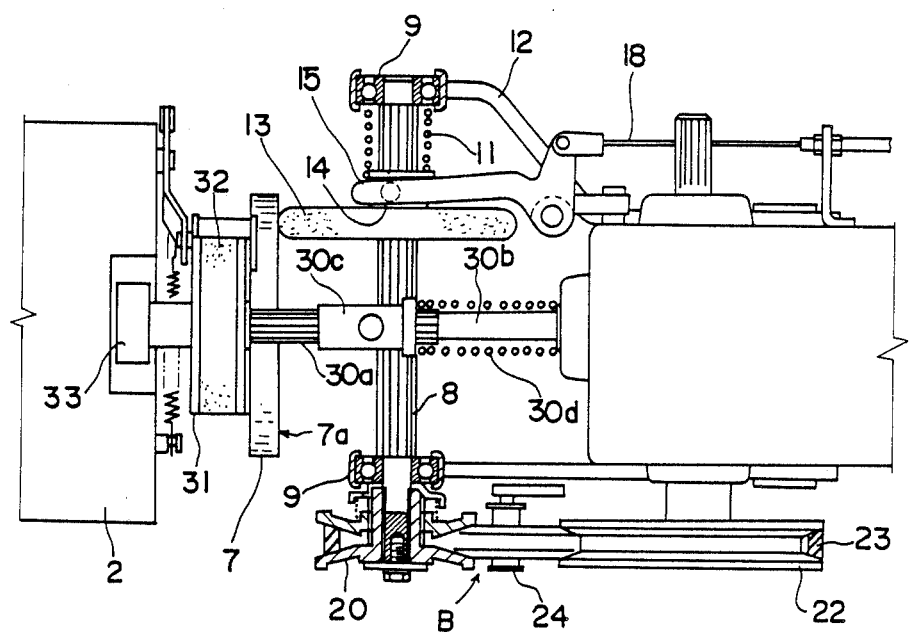
FIG. 2 is a plan view, partly in section, of the transmission system.

A spline shaft 8 acting as a first output shaft is supported by bearings 9 to extend along a transverse axis perpendicular to an axis of the output shaft 5 (FIG. 2). The bearings 9 are supported by stays 12 pivoted to the transmission case 4 to be oscillatable about an axis X1 extending parallel to the spline shaft 8. The spline shaft 8 carries a driven disk 13 having an elastic ring 13a fixed to its periphery for contact with a rear face 7a of the drive disk 7. The driven disk 13 defines grooves 14 engaged by a shift fork 15.

Figure 4:
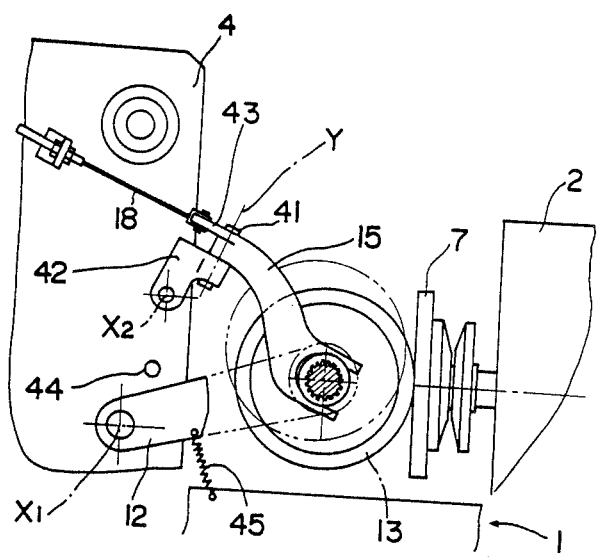
FIG. 4 is a schematic view of a shift mechanism for the disk type frictional stepless change speed apparatus.

A mechanism for operating the disk type frictional stepless change speed apparatus, namely for sliding the driven disk 13, will be described next with reference to FIG. 4. The shift fork 15 is fixed to a rod 41. An arm 42 is pivoted to the transmission case 4 to be oscillatable about an axis X2 extending parallel to the pivotal axis X1, and the rod 41 is pivotable on a vertical axis Y perpendicular to the pivotal axis X2 of the arm 42. The shift fork 15 has an arm 42 fixed to a portion thereof, from which a release wire 18 extends to be connected to a first change speed lever 35 provided on a steering handle 19. Thus a desired speed is provided by shifting the change speed levered 35 to a selected position. Number 44 denotes stopper pins for stopping the oscillation of stays 12 to facilitate shifting of the shift fork 15.

A spring 45 is provided to act as urging means with one end thereof attached to each stay 12 and the other end attached to the machine frame 1, to press the driven disk 13 toward the drive disk 7 through an oscillation about the axis X1.

For sliding the driven disk 13 in one direction by operating the change speed lever 35, the described mechanism first oscillates the stays 12 in a direction to move the driven disk 13 away from the drive disk 7 to relax the pressure of the driven disk 13 against the drive disk 7 and subsequently causes the driven disk 13 to slide relative to the drive disk 7. A sliding movement of the driven disk 13 in the other direction is assisted by a spring 11.

Consequently, a small operational force is required to slide the driven disk 13 by the shift operation. Further, since the sliding of the driven disk 13 in the abovementioned one direction is not forcibly caused while the driven disk 13 is pressed hard against the drive disk 7, their frictional transmission surfaces wear at a reduced rate compared with the case of the prior art.

The description of the transmission system will be continued with reference to FIGS. 2 and 3.

The spline shaft 8 carries a variable speed split pulley 20 at one end thereof, which is operatively connected by a belt 23 to a driven pulley 22 mounted on one end of an input shaft 21 of the transmission case 4. Number 24 denotes a tension pulley operatively connected by a wire to a second change speed lever 36 provided on the steering handle 19. The lever 36 is operable to positionally adjust the tension pulley 24 with respect to the belt 23 for varying the effective belt winding diameter of the split pulley 20. These elements constitute a belt type stepless change speed apparatus B for propelling the machine.

Figure 5:
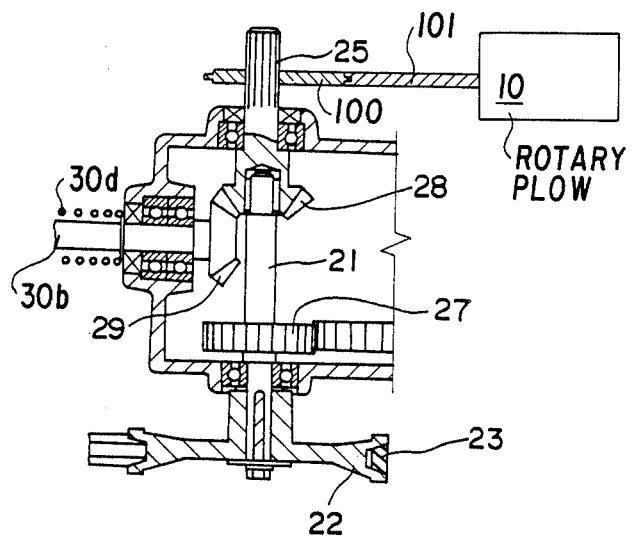
FIG. 5 is a plan view, partly in section, showing a transmission case interior.

As seen from FIG. 5, the input shaft 21 is fitted at the other end into an end of a power takeoff output shaft 25 supported at an opposite side of the transmission case 4. The input shaft 21 carries a gear 27 forming part of reduction gearing for transmitting power to an axle 26 disposed below. The power takeoff output shaft 25 carries a bevel gear 28 in mesh with a gear 29 mounted on a power takeoff branching transmission shaft 30 extending forwardly from the transmission case 4. This transmission shaft 30 extends to a position above the split pulley 6 and is supported by a bearing 33 provided above the engine 2.

The power takeoff 25 may be connected to the working implement, i.e. the rotary plow 10, by any convenient conventional means. For example, as illustrated in FIG. 5, a sprocket 100 may be affixed to the power takeoff 25 by any convenient means, and coupled to the rotary plow 10 by a conventional chain drive 101.

This transmission shaft 30 has a two-part construction comprising a first shaft portion 30a, a second shaft portion 30b coaxial with and spaced from the first shaft portion 30a, a sleeve shaft portion 30c splined to and bridging the two shaft portions 30a and 30b, and a spring 30d urging the sleeve shaft portion 30c to constantly maintain the shaft portions 30a and 30b coupled to each other. The first shaft portion 30a carries a driven pulley 31 in the form of a variable speed split pulley and operatively connected by a belt 32 to the split pulley 6.

For changing the driven pulley 31 or the belt 32 the sleeve shaft portion 30c is moved against the force of spring 30d to free the first shaft portion 30a. The belt 32 is changed through a space between the first and second shaft portions 30a and 30b. The driven pulley 31 is changed after removing the first shaft portion 30a from the bearing 33.

Number 34 denotes a tension pulley positionally adjustable with respect to the belt 32 and connected by a wire to a clutch lever 37 provided on the steering handle 19. The tension pulley 34 not only has a clutch function with respect to the transmission shaft 30 but acts as a main clutch with respect to the spline shaft 8. The driven pulley 31, the split pulley 6, the belt 32 wound round theses pulleys and the tension pulley 34 constitute a belt type stepless change speed apparatus C for transmitting power to the power takeoff system.

According to the above construction, an operation to disengage the tension clutch comprising the tension pulley 34 breaks the power transmission to the second, free rotation split pulley part 6b of the drive pulley 6 as well as the power transmission through the belt type stepless change speed apparatus C to the power takeoff branching transmission shaft 30. As a result, the drive disk 7 of the disk type frictional stepless change speed apparatus is released from the drive, also breaking power transmission to the propelling system.

Thus, the tension clutch of the belt type stepless change speed apparatus C acts as the main clutch not only to establish and break the power transmission to the power takeoff branching transmission shaft 30 but to establish and break the power transmission to the disk type frictional stepless change speed apparatus connected to the propelling system. A separate main clutch need not be provided specially for this purpose. This advantage is achieved by the compact power dividing transmission structure according to the present invention which effectively utilizes the intrinsic tension mechanism of the belt type stepless change speed apparatus C.

The disk type change speed apparatus A has a predetermined shifting range for the driven disk 13 to be capable of switching between backward and forward rotations. A change speed range of about 1:4 is set for the forward rotation, and an additional change speed range of about 1:4 is provided by the belt type stepless change speed apparatus C. The backward rotation has a change speed range of about 1:3. By reducing the speeds within these ranges, the rotational rates of the axle are set to the ranges required of the walking operator type agricultural machine, namely 10–120 rpm for forward rotation and 10–40 rpm for backward rotation.

Accordingly, only a speed reducing function may be performed in the transmission case, which dispenses with control devices for a shift rod in the transmission and a sealing structure therefor. As a result, the transmission case hardly requires inspection and maintenance work. Furthermore, since a shift gear need not be mounted in the transmission, means for preventing the gear from becoming disengaged is no longer required. The transmission case on the whole has now been greatly simplified and manufactured at low cost.

I claim:

1. A disk type frictional stepless change speed apparatus comprising:
    a drive disk,
    a driven disk in pressure contact with and receiving power from the drive disk,
    a driven shaft slidably carrying the driven disk,
    stays for supporting the driven shaft, said stays being oscillatable about an axis parallel to the driven shaft to permit the driven disk to be released from the pressure contact with the drive disk,
    urging means attached to the stays for pressing the driven disk against the drive disk,
    a change speed lever, and
    a driven disk shift mechanism comprising means for oscillating the stays in a direction to move the driven disk away from the drive disk by an initial movement of the change speed lever in a given direction and for sliding the driven disk into contact with the drive disk by further movement of the change speed lever in the same direction, thereby to effect movement of the driven disk away from the drive and speed changing by continuous movement of the change speed lever in a single direction.

2. A walking operator type agricultural machine equipped with the disk type frictional stepless change speed apparatus as claimed in claim 1, comprising;
    a machine frame,
    an engine mounted at a front portion of the machine frame and including a power output shaft,
    a transmission case mounted at an intermediate portion of the machine frame, said transmission case bearing ground-engaging wheels and including an input shaft, and
    a working implement mounted at a rear portion of the machine frame,
    wherein power transmission from the power output shaft to the input shaft for driving the ground-engaging wheels is effected through said disk type frictional stepless change speed apparatus and a belt type change speed apparatus.

3. An agricultural machine as claimed in claim 2 wherein the power output shaft is connected to the drive disk of the disk type frictional stepless change speed apparatus, and the input shaft is disposed parallel to the driven shaft of the disk type frictional stepless change speed apparatus, said belt type change speed apparatus being disposed between the driven shaft and the input shaft to transmit power from the driven shaft to the input shaft.

4. A disk type frictional stepless change speed apparatus comprising:
    a drive disk,
    a driven disk in pressure contact with and receiving power from the drive disk,
    a driven shaft slidably carrying the driven disk,
    stays for supporting the driven shaft, said stays being oscillatable about an axis parallel to the driven shaft to permit the driven disk to be released from the pressure contact with the drive disk,
    urging means attached to the stays for pressing the driven disk against the drive disk,
    a change speed lever, and
    a driven disk shift mechanism for oscillating the stays in a direction to move the driven disk away from the drive disk by an initial operation of the change speed lever and for sliding the driven disk into contact with the drive disk by a subsequent operation of the change speed lever, thereby to effect speed changing, said driven disk shift mechanism including an arm oscillatable on a second axis parallel to said axis of oscillation of the stays, a rod attached to the arm and having an axis perpendicular to said second axis, and a shift fork having one end in engagement with the driven disk and oscillatably connected to the arm by means of the rod, the operation of the change speed lever displacing the arm first and displacing the shift fork subsequently.

5. A change speed apparatus as claimed in claim 4 wherein said driven shaft is provided with urging means to urge the driven disk for sliding in one direction.

6. A change speed apparatus as claimed in claim 5 wherein said change speed lever is provided with lever retaining means to retain the change speed lever in a selected change speed position.

7. A power transmission apparatus for dividing an output of a drive shaft and transmitting divided outputs to a first transmission line and a second transmission line, comprising;

a drive pulley attached to the drive shaft and including a first split pulley connected to rotatable in unison with the drive shaft and a second split pulley rotatable relative to the drive shaft, a disk type frictional stepless change speed mechanism for transmitting a torque having undergone a change speed operation to the second transmission line, said disk type frictional stepless change speed mechanism including a drive disk formed integrally with said second split pulley, a transmission shaft constituting part of the first transmission line and carrying a driven pulley at a position opposed to the drive pulley, a belt for transmitting power from the drive pulley to the driven pulley, and a tension clutch including a tension pulley to act on the belt, said tension clutch being operable to reduce tension of the belt below a predetermined value thereby to break both power transmission by the belt and power transmission by the disk type frictional stepless change speed mechanism.

8. A power transmission apparatus as claimed in claim 7 wherein said transmission shaft includes a first shaft portion carrying the driven pulley, a second shaft portion coaxial with and spaced from the first shaft portion, and coupling means for releasably coupling the first and second shaft portions.

9. A power transmission apparatus as claimed in claim 8 wherein said coupling means comprises a spline type coupling slidable to uncouple the first and second shaft portions and urging means to urge said spline type coupling to a position to couple the first and second shaft portions.

10. A power transmission apparatus as claimed in claim 7 wherein said disk type frictional change speed mechanism comprises;

a drive disk, a driven disk in pressure contact with and receiving power from the drive disk, a driven shaft slidably carrying the driven disk, stays for supporting the driven shaft said stays being oscillatable about an axis parallel to the driven shaft to permit the driven disk to be released from the pressure contact with the drive disk, urging means attached to the stays for pressing the driven disk against the drive disk, a change speed lever, and a driven disk shift mechanism for oscillating the stays in a direction to move the driven disk away from the drive disk by an initial operation of the change speed lever and for sliding the driven disk into contact with the drive disk by a subsequent operation of the change speed lever, thereby to effect speed changing.

11. A power transmission apparatus as claimed in claim 10 wherein said driven disk shift mechanism includes an arm oscillatable on a second axis parallel to said axis of oscillation of the stays, a rod attached to the arm and having an axis perpendicular to said second axis, and a shift fork having one end in engagement with the driven disk and oscillatably connected to the arm by means of the rod, the operation of the change speed lever displacing the arm first and displacing the shift fork subsequently.

12. A walking operator type agricultural machine equipped with the power transmission apparatus as claimed in claim 7, comprising;

a machine frame, an engine mounted at a front portion of the machine frame and including a power output shaft, a transmission case mounted at an intermediate portion of the machine frame, said transmission case bearing ground-engaging wheels and including an input shaft and a transmission mechanism constituting the second transmission line, a working implement mounted at a rear portion of the machine frame and adapted to receive the power through the first transmission shaft, wherein power transmission from the power output shaft to the input shaft for driving the ground-engaging wheels is effected through said disk type frictional stepless change speed apparatus and a belt type change speed apparatus.

13. An agricultural machine as claimed in claim 12 wherein the power output shaft is connected to the drive disk of the disk type frictional stepless change speed apparatus, and the input shaft is disposed parallel to the driven shaft of the disk type frictional stepless change speed apparatus, said belt type change speed apparatus being disposed between the driven shaft and the input shaft to transmit power from the driven shaft to the input shaft.

14. An agricultural machine as claimed in claim 13 wherein the input shaft has one end thereof in end to end abutment with a power takeoff shaft for driving the working implement, said power takeoff shaft receiving power from the transmission shaft through bevel gears.

15. An agricultural machine equipped with the power transmission apparatus as claimed in claim 10, comprising;

a machine frame, an engine mounted at a front portion of the machine frame and including a power output shaft, a transmission case mounted at an intermediate portion of the machine frame, said transmission case bearing ground-engaging wheels and including an input shaft and a transmission mechanism constituting the second transmission line, a working implement mounted at a rear portion of the machine frame and adapted to receive the power through the first transmission shaft, wherein power transmission from the power output shaft to the input shaft for driving the ground-engaging wheels is effected through said disk type frictional stepless change speed apparatus and a belt type change speed apparatus.

16. An agricultural machine as claimed in claim 15 wherein the power output shaft is connected to the drive disk of the disk type frictional stepless change speed apparatus, and the input shaft is disposed parallel to the driven shaft of the disk type frictional stepless change speed apparatus, said belt type change speed apparatus being disposed between the driven shaft and the input shaft to transmit power from the driven shaft to the input shaft.

17. An agricultural machine as claimed in claim 16 wherein the input shaft has one end thereof in end to end abutment with a power takeoff shaft for driving the working implement, said power takeoff shaft receiving power from the transmission shaft through bevel gears.

* * * * *